(12) United States Patent
Mueller et al.

(10) Patent No.: US 6,716,799 B1
(45) Date of Patent: Apr. 6, 2004

(54) USE OF SELECTED FATTY ALCOHOLS AND THEIR MIXTURES WITH CARBOXYLIC ACID ESTERS AS LUBRICANT COMPONENTS IN WATER-BASED DRILLING FLUID SYSTEMS FOR SOIL EXPLORATION

(75) Inventors: Heinz Mueller, Monheim (DE); Claus-Peter Herold, Mettmann (DE); Stephan Von Tapavicza, Ekrath (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 09/308,400

(22) PCT Filed: Nov. 10, 1997

(86) PCT No.: PCT/EP97/06230

§ 371 (c)(1),
(2), (4) Date: Jun. 1, 1999

(87) PCT Pub. No.: WO98/22551

PCT Pub. Date: May 28, 1998

(30) Foreign Application Priority Data

Nov. 18, 1996 (DE) .......................................... 196 47 598

(51) Int. Cl.$^7$ ................................................. C09K 7/02
(52) U.S. Cl. ........................ 507/138; 507/139; 507/141; 507/145
(58) Field of Search ................. 507/138, 139, 507/141, 145, 140

(56) References Cited

U.S. PATENT DOCUMENTS

| | | | |
|---|---|---|---|
| 3,479,285 A | * 11/1969 | Barthauer | 507/138 |
| 3,761,410 A | * 9/1973 | Monpshine et al. | 507/138 |
| 4,409,108 A | * 10/1983 | Carney et al. | 507/138 |
| 5,194,422 A | * 3/1993 | Mueller et al. | 507/138 |
| 5,232,910 A | 8/1993 | Mueller et al. | 507/138 |
| 5,252,554 A | 10/1993 | Mueller et al. | 507/138 |
| 5,318,954 A | 6/1994 | Mueller et al. | 507/138 |
| 5,318,956 A | 6/1994 | Mueller et al. | 507/139 |
| 5,348,938 A | 9/1994 | Mueller et al. | 507/139 |
| 5,403,822 A | 4/1995 | Mueller et al. | 507/138 |
| 5,441,927 A | 8/1995 | Mueller et al. | 507/138 |
| 5,618,780 A | 4/1997 | Argillier et al. | 508/503 |

FOREIGN PATENT DOCUMENTS

| | | |
|---|---|---|
| EP | 0 347 671 | 6/1990 |
| EP | 0 374 672 | 6/1990 |
| EP | 0 386 636 B1 | 9/1990 |
| EP | 0 386 636 B2 | 9/1990 |
| EP | 0 386 638 | 9/1990 |
| EP | 0 391 252 A1 | 10/1990 |
| EP | 0 391 252 B1 | 10/1990 |
| EP | 0 398 112 | 11/1990 |
| EP | 0 398 113 | 11/1990 |
| EP | 0 535 074 B1 | 4/1993 |
| EP | 0 472 558 B1 | 9/1994 |
| EP | 0 713 909 | 5/1996 |
| EP | 0 770 661 A1 | 5/1997 |
| WO | WO91/19771 | 12/1991 |

OTHER PUBLICATIONS

Eigner, Field Trials with Silicate Base Mud: a New Water Base Mud System (1996).
I. Ward et al., Silicate Water Based Muds—A Significant Advance in Water Based Drilling Fluid Technology (1996).
Fatty Alcohols: Raw Materials, Processes, Application (Henkel 1982).
Ullmann's Encyclopedia of Industrial Chemistry, 5.Edition, vol. A15.
Derwent Patent Abstract (WPAT) No. 90–349916/47.
Derwent Patent Abstract (WPAT) No. 90–349915/47.
Derwent Patent Abstract (WPAT) No. 90–306702/41.
Derwent Patent Abstract (WPAT) No. 96–253038/26.
Derwent Patent Abstract (WPAT) No. 92–024393/03.
Derwent Patent Abstract (WPAT) No. 90–194905/26.
Derwent Patent Abstract (WPAT) No. 90–194333826.
Derwent Patent Abstract (WPAT) No. 90–276696/37.
Derwent Patent Abstract (WPAT) No. 90–276694/37.
Derwent Patent Abstract (WPAT) No. 92–024393/03.
Derwent Patent Abstract (WPAT) No. 90–306702/41.
Gray et al., Composition and Properties of Oil Well Drilling Fluids (Gulf Publishing, 4th ed. 1980, at 50–51, 64–65, 320–25, 526–87.
Burgoyne, Jr. et al., Applied Drilling Engineering (Soc. Petr. Eng. 1986) at 76–81.

\* cited by examiner

Primary Examiner—Philip Tucker
(74) Attorney, Agent, or Firm—John E. Drach; Glenn E. J. Murphy; Steven J. Trzaska

(57) ABSTRACT

The invention relates to the use of linear and/or branched fatty alcohols containing at least 12 carbon atoms in the molecule and/or to the use of mixtures of such fatty alcohols with carboxylic acid esters as a lubricating additive in water-based drilling fluids for their use in geological exploration by drilling. The fatty-alcohol-based lubricants or lubricant systems are particularly suitable for use in water-based alkali metal silicate drilling muds which are known to be distinguished by comparatively high pH values. The additives according to the invention combine their lubricating effect with a foam-suppressing effect, i.e. prevent unwanted foaming.

22 Claims, No Drawings

USE OF SELECTED FATTY ALCOHOLS AND THEIR MIXTURES WITH CARBOXYLIC ACID ESTERS AS LUBRICANT COMPONENTS IN WATER-BASED DRILLING FLUID SYSTEMS FOR SOIL EXPLORATION

BACKGROUND OF THE INVENTION

1. Field of the Invention

This invention relates generally to water-based drilling fluids of the type used in particular as so-called drilling muds in geological exploration by drilling. In the following, the invention is described with reference to pure water-based drilling fluids and drilling muds based thereon. However, the modification according to the invention of auxiliary fluids of the type in question is by no means confined to this particular application and may also be applied in particular to auxiliary fluids for tackling problems arising from differential sticking, more particularly to spotting fluids and to fluids used for workover stimulation and comparable geological drilling applications.

2. Discussion of Related Art

In the relevant technology of the geological exploration of, for example, oil and/or gas occurrences, there are three basic types of auxiliary fluids, more particularly corresponding drilling muds, used in practice, namely: oil-based systems which generally comprise a continuous oil phase mixed with a disperse water phase in the form of so-called w/o invert muds, water-based oil/water systems in which the aqueous phase with its dissolved and dispersed auxiliaries forms the continuous phase and the oil phase is dispersed therein in the form of a fine emulsion and, finally, pure water-based drilling fluids.

The pure water-based systems are the oldest in the historical development of drilling fluids. However, their use is attended by such serious disadvantages that, hitherto, only limited application has been possible. Above all, the interaction of the water-based drilling fluids with the water-sensitive layers of rock—more particularly corresponding layers of clay—to be drilled leads to unacceptable interference with the drilling process.

Very recently, however, a fairly old proposal has been taken up again and, even in highly sensitive shale formations, can lead to adequate stability where purely water-based drilling fluids are used. It involves the use of corresponding systems based on soluble alkali metal silicates which are also known as waterglasses or waterglass-based systems, cf. for example the seminar on "The Prevention of Oil Discharge from Drilling Operations" held in public in Aberdeen on 18th/19th June 1996 (organized by IBC Technical Services, London) and, in particular, the publications appearing in this connection by M. Eigner entitled "Field Trials with a Silicate drilling Fluid in Shell-Expro" and by I. Ward and B. Williamson entitled "Silicate Water Based Muds—a Significant Advance in Water Based Drilling Fluid Technology".

However, the use of purely water-based drilling fluids, particularly of the last-mentioned type, makes the presence of components with a lubricating effect desirable. Relevant specialist knowledge is relevant in this regard. It is known that carboxylic acid esters have a particularly pronounced lubricating effect which is utilized in many respects in geological exploration. However, their use in water-based systems and, in particular, in comparatively highly alkaline waterglass systems can lead to serious difficulties. Ester cleavage can result in the formation as secondary products of components with a marked tendency to foam which then introduce unwanted problems into the drilling fluid. The above-cited publication by I. Ward et al. refers specifically to this problem.

The problem addressed by the present invention was to provide lubricants for water-based drilling fluids and, more particularly, for high-pH silicate-containing waterglass-based drilling fluids which would be at least partly stable to hydrolysis, but which at the same time would also enable carboxylic acid esters to be used if required and would thus preclude the adverse effects of potential hydrolysis through their pronounced foam-suppressing effect.

SUMMARY OF THE INVENTION

A The present invention relates to the use of selected linear and/or branched fatty alcohols containing at least 12 carbon atoms in the molecule and to the use of mixtures of these fatty alcohols with carboxylic acid esters as a lubricating additive in water-based drilling fluids for their use in geological exploration by drilling.

More particularly, the invention relates to the use of these fatty-alcohol-based lubricants as an additive in water-based alkali metal silicate drilling fluids.

Particulars of the Teaching According to the Invention

In the course of the development work for new water-based drilling fluids, it was found that special alcohols have favourable lubricating properties in such drilling fluids. Fatty alcohols of the type according to the present invention have the additional advantage that they are stable even in highly alkaline water-based fluids. Because of this, they were also tested in particular in modern silicate drilling fluids (waterglass systems).

It was surprisingly found that certain fatty alcohols of the type according to the invention—described in detail hereinafter—exhibit extremely good lubricating properties even though their lubricating effect in other clay-containing water-based drilling fluids is not particularly remarkable.

The positive effects of the selected fatty-alcohol-based auxiliaries on which the invention is based can be further enhanced by using the fatty alcohols together with carboxylic acid esters characterized by good lubricity. Further observations in this regard will again be made hereinafter. It is remarkable that, despite the expected partial ester cleavage and the resulting theoretical danger of an increase in the tendency to foam, there are no unwanted effects in this direction. The foam-suppressing effect of the fatty alcohols compulsorily used in accordance with the invention—in the form of their intimate mixture with the esters—is evidently so great that the desired advantage of the enhanced lubricating effect can be utilized here without having to accept disadvantages in the form of increasing foaming in practice. Even as hydrolysis products, certain selected esters (see the following disclosure) provide special effects in helping to solve the problem addressed by the invention.

The fatty alcohols used in accordance with the invention are first described in broader and in preferred definitions in the following, after which suitable and particularly preferred ester mixing components are similarly discussed.

Fatty alcohols are known to be monohydric alcohols with comparatively long hydrocarbon chains which in turn may be linear and/or branched. Corresponding fatty alcohols in the $C_{12-30}$ range are particularly suitable, fatty alcohols in the $C_{12-24}$ range being particularly preferred for use in accordance with the invention.

The fatty alcohols may be of natural and/or synthetic origin. It is known that fatty alcohols of natural origin are obtained from the corresponding fatty acids by reduction of the terminal carboxyl group to the alcohol group. The fatty acids of natural origin in the C chain length range in question are generally present in the form of mixtures of aliphatically saturated and/or olefinically unsaturated acids. The olefinically unsaturated acids with at least 14 to 16 carbon atoms in the molecule contain varying amounts of mono- and/or polyolefinically unsaturated compounds, depending on the natural material source. By suitably selecting the reduction conditions, it is possible to achieve at least substantially specific reduction of the carboxyl group without any effect on the olefinic double bonds in the carbon chain so that correspondingly mono- and/or polyunsaturated fatty alcohols, for example in the $C_{16-24}$ range and more particularly in the $C_{16/18}$ range, are available. The relevant specialist literature on this subject is represented, for example, by the book published by applicants entitled "Fettalkohole, Rohstoffe, Verfahren und Verwendung (Fatty Alcohols, Raw Materials, Processes and Uses)" which contains detailed information on industrial processes for the production of fatty alcohols, on the analysis and characteristic data of fatty alcohols and on the physicochemical properties of these fatty alcohols of natural origin. Linear olefinically unsaturated $C_{16/18}$ fatty alcohols or mixtures of fatty alcohols consisting at least predominantly of such components are particularly suitable for use as the fatty alcohol component in accordance with the present invention. Systems of the type in question which flow at room temperature can be particularly important although the invention is by no means confined to such systems. Corresponding commercial products are marketed by Applicants under the registered names of "HD-OCENOLS".

Fatty alcohols with a branched carbon chain may be obtained either by pure syntheses, for example including the oligomerization of lower ethylenically unsaturated hydrocarbons, or by dimerization of alcohols of natural origin to form branched alcohols of the Guerbet type. The condensation of comparatively lower primary alcohols by heating at temperatures of 200 to 300° C. in the presence of alkali, for example potassium hydroxide or potassium alcoholate, leads to Guerbet alcohols branched in the 2-position to the hydroxyl group, cf. applicants' above-cited publication entitled "Fettalkohole . . . (Fatty Alcohols . . . )".

In the efforts to find a solution to the problem addressed by the invention, it was found that these Guerbet alcohols and, more particularly, corresponding alcohols in the $C_{12-20}$ range are extremely effective in helping to solve that problem. Particularly important Guerbet alcohols are those in the $C_{16-20}$ range. The constitution of branched alcohols of this type makes them flowable at room temperature with pour points generally below 0° C.

So far as the fatty alcohol component is concerned, the teaching according to the invention may be summarized as follows: on the one hand, olefinically unsaturated alcohols, more particularly in the $C_{16/18}$ range, of the type marketed as "HD-OCENOLS" are particularly preferred. Of these, oleyl-alcohol-based fatty alcohols or fatty alcohol mixtures are especially suitable. On the other hand, Guerbet alcohols in the $C_{16-20}$ range and more particularly in the $C_{16/18}$ range are particularly important auxiliaries in the context of the present invention. This applies above all to their resurrected use in highly alkaline waterglass-based silicate drilling fluids.

According to the invention, these fatty alcohols are added on their own to the water-based drilling fluids. In one preferred embodiment, however, they are used—as previously mentioned—in the form of a mixture with carboxylic acid esters. It is known that carboxylic acid esters of various types can influence improvements in lubricity, particularly in water-based drilling muds. General expert knowledge may be applied in this regard. The more recent prior art is represented, for example, by EP 0 713 909.

Basically, therefore, esters of mono- and/or polybasic carboxylic acids and mono- and/or polyhydric alcohols are suitable for mixing with the fatty alcohols defined in accordance with the invention. A preferred class of such esters is based on corresponding reaction products of linear, optionally olefinically unsaturated and/or branched monocarboxylic acids of the fatty range. Preferred acid components of this class of esters contain corresponding $C_{12-24}$ and, more particularly, $C_{14-20}$ hydrocarbon radicals in their acid constituent.

As already mentioned in connection with the fatty alcohols, it may again be desirable in the case of the esters to use components which are flowable at room temperature. This preferred property can be established and regulated in known manner in the esters of long-chain fatty acids by providing an adequate number of olefinic double bonds in the hydrocarbon chain and/or by giving the hydrocarbon chains a branched structure. Accordingly, corresponding esters of fatty acids of natural and/or synthetic origin which meet the above-mentioned parameters are suitable for use.

The ester-forming alcohol components may be monohydric and/or polyhydric. Among the monohydric ester-forming alcohols, corresponding fatty alcohols are particularly important. The special definitions given above in connection with the fatty alcohol component again apply to general and preferred representatives. Accordingly, esters of $C_{12-24}$ and, more particularly, $C_{14-20}$ fatty alcohols are particularly suitable. Mono- and/or polyolefinically unsaturated fatty alcohols can again be particularly important. The foregoing observations on the products marketed by applicants as "HD-OCENOLS" again apply.

It will readily be appreciated in this connection that esters which contain corresponding long-chain hydrocarbon radicals not only in their fatty acid component, but also in their alcohol component are distinguished by particularly good and effect-enhancing lubricating properties. In addition, esters of the type discussed here change through partial hydrolysis into the essential active component—described at the beginning—of the lubricants used in accordance with the invention. Besides the fatty acids released, which are converted into their salts in the normally basic water-based drilling fluids, the free fatty alcohols and hence the essential lubricant component according to the invention are formed. One example of a typical representative of this type is oleyl oleate; another is isotridecyl stearate.

Basically, however, esters of alcohols with relatively short carbon chains may also be used, for example fatty acid esters in the C-chain length range mentioned with monohydric alcohols containing at least 4 carbon atoms and preferably at least 6 to 8 carbon atoms. Ester oils of this type are now alternative oil phases used on a large scale for oil-based drilling muds. The relevant literature is represented by applicants' corresponding European patents EP 0 374 671, EP 0 374 672, EP 0 386 638, EP 0 386 636 and EP 0 535 074 which describe particularly suitable polycarboxylic acid esters for use in oil- and/or water-based drilling muds. Further particulars of oleophilic alcohols in drilling fluids can be found in EP 0 391 252 and in EP 0 472 558.

However, other suitable ester components are corresponding compounds of, in particular, lower polyhydric alcohols, for example of the glycol, glycerol or trimethylolpropane type, and lower alcohols containing in particular up to 6 carbon atoms and a corresponding number of hydroxyl groups. Examples include esters or partial esters of glycoses or lower alkyl glycosides with, in particular, fatty acids having the structures defined above. Accordingly, preferred polyhydric alcohols contain up to 6 carbon atoms and up to 6 hydroxyl groups in the molecule. In the case of the polyhydric alcohols, triglycerides, more particularly triglycerides of natural origin, can be of particular importance. They have proved to be effective mixing components for mixing with the linear and/or branched fatty alcohols defined at the beginning.

Fatty-alcohol-based lubricants or lubricant systems corresponding to the above definition are generally present in the water-based drilling fluids in quantities of at most 10% by weight and, preferably, in far smaller quantities. Preferred limits are about 5% by weight or lower. Additions of 0.5 to 3% by weight and, more particularly, 1 to 3% by weight can be particularly effective.

The mixtures of linear and/or branched fatty alcohols with esters optionally used in accordance with the invention have ester contents of no more than about 80% by weight and preferably no more than 60 to 70% by weight (% by weight, based on the sum of fatty alcohol and ester). Particularly suitable mixtures of fatty alcohol(s) and ester(s) contain around 25 to 55% by weight of ester, again based on the mixture of fatty alcohol and ester. Mixtures of approximately equal parts by weight can be particularly suitable.

Water-based drilling fluids and the additives to be used therein, such as weighting agents, fluid loss additives, alkali reserves, viscosity controllers and the like, are extensively described in the general literature and relevant patent literature. Detailed information can be found, for example, in the book by George R. Gray and H. C. H. Darley entitled "Composition and Properties of Oil Well Drilling Fluids", 4th Edition, 1980/81, Gulf Publishing Company, Houston and the extensive scientific and patent literature cited therein and in the manual entitled "Applied Drilling Engineering" by Adam T. Borgoyne, Jr. et al., First Printing Society of Petroleum Engineers, Richardson, Texas (USA). The water-based silicate muds with which the teaching according to the invention is particularly concerned are also general expert knowledge, cf. in particular the relevant publications cited at the beginning. Basically, suitable alkali metal silicates are, in particular, water-soluble sodium silicate and/or water-soluble potassium silicate with modulus values (molar ratio of $SiO_2$ to $Na_2O$ or $K_2O$) of 1.0 to 3.3 and preferably 1.5 to 2.5. Preferred concentrations of the alkali metal silicates in the water-based fluids are at most about 10% by weight and preferably slightly lower, for example in the range from about 3 to 8% by weight and preferably in the range from about 4 to 7% by weight. The alkali metal silicates are normally accompanied by high concentrations of soluble nonreactive salts, more particularly alkali metal chlorides (especially sodium and/or potassium chloride), in the water-based fluid phases. Correspondingly salt-saturated water-based silicate muds are preferred in practice. The pH values of these liquid phases are, comparatively speaking, in the strongly alkaline range and are above pH 10 and, more particularly, are at least at pH 11. It is in this class of highly alkaline silicate muds that the lubricants according to the invention have proved to be particularly effective when added in small quantities of, for example, 1 to 3% by weight, based on the mud as a whole. So far as the resurgent use of these purely water-based systems is concerned, it is possible by using very small quantities of organic components selected in accordance with the invention to achieve a substantial improvement in performance equivalent to that known in principle for the use of components with a lubricating effect in water-based systems.

According to the invention, it may be advisable to secure and/or improve the lubricating effect of the added component even under working conditions involving extreme pressure. There are various known additives for such working conditions, so-called extreme-pressure additives, which effectively secure improved lubrication in such conditions.

The prior-art literature in this regard is represented by "Ullmann's Encyclopedia of Industrial Chemistry", 5th Edition, Volume A15, Chapter "Lubricants and Related Products" and the associated Sub-chapter 7.5 "Extreme-Pressure Additives" (loc. cit., pages 450/1). An additional disclosure in this connection can be found in Sub-chapter 4.4 "Phosphoric Acid Esters", loc. cit., pages 440/1.

These literature references describe many representatives of extreme-pressure lubricants from a plurality of classes of at least predominantly organic compounds. The following representatives in particular are named: P-containing organic compounds, for example aromatic and/or aliphatic esters—including corresponding partial esters—of acids of phosphorus and/or partial salts thereof, for example corresponding phosphates and/or phosphonates; sulfurized organic compounds in which polysulfidic bridge elements in particular yield sulfur accessible under in-use conditions for covering/reacting off with metal surfaces, for example sulfurized hydrocarbon compounds, sulfurized ester oils, corresponding fatty alcohols, fatty acids and the like; organic nitrogen compounds, such as aromatic nitro compounds, aminophenol derivatives, esters of carbamic acids, salts of organic bases with organic acids and, finally, organohalogen compounds.

Multicomponent additives in which two or more of the classes of compounds mentioned are mixed or combined in the molecular structure are particularly effective. Combinations of sulfur-, phosphorus- and/or nitrogen-containing additives are particularly suitable.

Where additives of the type in question, particularly extreme-pressure additives, are used, they are normally added to the lubricating additives or mixtures according to the invention in small quantities.

EXAMPLES

The following Examples compare the values determined by measurement for a number of lubricant compositions corresponding to the teaching of the invention with the same measured values of a blank test where no lubricant is added.

In every case, the water-based drilling fluid used is a waterglass-based sodium silicate fluid having the following composition:

| | |
|---|---|
| Saturated aqueous sodium chloride solution | 253 g |
| 40% by weight aqueous waterglass solution (sodium silicate with a modulus of about 2.2) | 59.4 g |
| Xanthan polymer | 0.4 g |
| Dry starch in the form of a fine powder | 8.5 g |
| Water-soluble amine component | 1.7 g |
| Barite | 176 g |

The lubricating effect is numerically determined in the commercially available standard device ("Reichert frictional wear balance") which can be obtained together with the necessary instructions for use and evaluation of results through the firm "SUR-Berlin", Sommer & Runge KG, D-1000 Berlin 48, Symeonstrasse.

The following comparison tests determine the particular friction-worn area measured per test formulation in mm² and also the final temperature assumed by the tested fluid sample in the particular test.

The identical operating conditions in all tests in the frictional wear balance are: 200 metres covered under a load of 1500 p.

The lubricant additives according to the invention identified in the following Examples are added to the aqueous waterglass-based test fluid in a quantity of 3% by weight. In every case, the mixing ratio of fatty alcohol to ester is 1:1 (parts by weight). The Examples may be summarized as follows:

Comparison Example
No lubricants added.

Example 1
Addition of a Lubricant Mixture of $C_{20}$ Guerbet Alcohol/oleyl Oleate Example 2
Addition of a Lubricant Based on a Mixture of Oleyl Alcohol (Mixed with Small Amounts of Distillation Residue)/Oleyl Oleate Example 3
Addition of a Lubricant Based on the Oleyl Alcohol Used in Example 2/Isotridecyl Stearate Example 4
Addition of a Lubricant Based on $C_{16}$ Guerbet Alcohol/isotridecyl Stearate Example 5
Oleyl-alcohol-based Lubricant of Example 2, but Without the Oleyl Oleate The abrasion values in mm² (average of 3 measurements) determined in the individual tests are set out in the following Table together with the final temperatures of the test fluid phases.

| Examples | Abrasion in mm² (3x determination) | Temperature effect in ° C. |
|---|---|---|
| Comparison Example | 6.0–6.5 | 54–55 |
| 1 | 4.0–4.5 | 44–46 |
| 2 | 4.5–5.0 | 45–46 |
| 3 | 5.3–5.6 | 47–48 |
| 4 | 4.4–4.8 | 47–49 |
| 5 | 4.8–5.3 | 43–44 |

The lubricating effect of the additives according to the invention is reflected both in the reduction of the worn areas and in the reduction of the final temperature assumed by the tested fluid phase.

What is claimed is:

1. A water-based drilling fluid comprising:
    a) 0.5 to 5 percent by weight of a fatty alcohol-based additive comprising linear or branched monohydric fatty alcohol having at least 12 carbon atoms;
    b) a soluble alkali metal silicate; and
    c) water.

2. The water-based drilling fluid of claim 1 wherein the fatty alcohol-based additive is present at from 1 to 3 percent by weight based on the water-based drilling fluid.

3. The water-based drilling fluid of claim 1 wherein said fatty alcohol contains from 12 to 30 carbon atoms.

4. The water-based drilling fluid of claim 3 wherein said fatty alcohol contains from 12 to 24 carbon atoms.

5. The water-based drilling fluid of claim 1 wherein said fatty alcohol is a mono- or polyolefinically unsaturated $C_{16-24}$ fatty alcohol.

6. The water-based drilling fluid of claim 1 wherein said fatty alcohol is a $C_{12-20}$ Guerbet alcohol.

7. The water-based drilling fluid of claim 6 wherein said fatty alcohol is a $C_{16-20}$ Guerbet alcohol.

8. The water-based drilling fluid of claim 1 wherein said fatty-alcohol-based additive is flowable at room temperature.

9. The water-based drilling fluid of claim 1 wherein the fatty alcohol-based additive further comprises a carboxylic acid ester.

10. The water-based drilling fluid of claim 9 wherein said fatty alcohol-based additive comprises up to 80 percent by weight carboxylic acid ester.

11. The water-based drilling fluid of claim 10 wherein said fatty alcohol-based additive comprises up to 60 percent by weight carboxylic acid ester.

12. The water-based drilling fluid of claim 11 wherein said fatty alcohol-based additive comprises 25 to 65 percent by weight carboxylic acid ester.

13. The water-based drilling fluid of claim 9 wherein said carboxylic acid ester is the reaction product of a mono- or polybasic carboxylic acid with a mono- or polyhydric alcohol.

14. The water-based drilling fluid of claim 13 wherein said carboxylic acid is a linear monocarboxylic acid containing from 12 to 24 carbons.

15. The water-based drilling fluid of claim 14 wherein said linear monocarboxylic acid contains from 14 to 20 carbons.

16. The water-based drilling fluid of claim 13 wherein said carboxylic acid ester is the reaction product of $C_{12-24}$ monocarboxylic acid with $C_{12-24}$ monohydric alcohol.

17. The water-based drilling fluid of claim 16 wherein said carboxylic acid ester is the reaction product of $C_{12-20}$ monocarboxylic acid with $C_{12-20}$ monohydric alcohol.

18. The water-based drilling fluid of claim 17 wherein said carboxylic acid ester is the reaction product of $C_{12-20}$ monocarboxylic acid with $C_{12-20}$ monohydric alcohol.

19. The water-based drilling fluid of claim 13 wherein said carboxylic acid ester is the reaction product of $C_{12-24}$ monocarboxylic acid with a polyhydric alcohol containing up to 6 carbon atoms and up to 6 hydroxyl groups.

20. The water-based drilling fluid of claim 19 wherein said carboxylic acid ester is the reaction product of $C_{12-20}$ monocarboxylic acid with polyhydric alcohol containing up to 6 carbon atoms an up to 6 hydroxyl groups.

21. The water-based drilling fluid of claim 19 wherein the carboxylic acid ester is a triglyceride.

22. The water-based drilling fluid of claim 1 wherein said fatty-alcohol-based additive further comprises an extreme-pressure additive.

* * * * *